United States Patent
Osborn et al.

(10) Patent No.: US 12,289,396 B2
(45) Date of Patent: Apr. 29, 2025

(54) PARALLEL SECRET SALT GENERATION AND AUTHENTICATION FOR ENCRYPTED COMMUNICATION

(71) Applicant: Capital One Services, LLC, McLean, VA (US)

(72) Inventors: Kevin Osborn, Henrico, VA (US);
James Zarakas, Centreville, VA (US);
Mark C. Dupuis, McLean, VA (US);
Srinivasa Chigurupati, Long Grove, IL (US)

(73) Assignee: Capital One Services, LLC, McLean, VA (US)

( * ) Notice: Subject to any disclaimer, the term of this patent is extended or adjusted under 35 U.S.C. 154(b) by 249 days.

(21) Appl. No.: 17/890,628

(22) Filed: Aug. 18, 2022

(65) Prior Publication Data
US 2024/0064004 A1    Feb. 22, 2024

(51) Int. Cl.
*H04L 9/08*    (2006.01)

(52) U.S. Cl.
CPC .......... *H04L 9/0819* (2013.01); *H04L 9/0844* (2013.01); *H04L 9/085* (2013.01)

(58) Field of Classification Search
None
See application file for complete search history.

(56) References Cited

U.S. PATENT DOCUMENTS

| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |

(Continued)

FOREIGN PATENT DOCUMENTS

| CA | 3010336 | 7/2017 |
| CN | 101192295 A | 6/2008 |

(Continued)

OTHER PUBLICATIONS

Notification of Transmittal of the International Search Report and the Written Opinion of the International Searching Authority issued in PCT/US2023/030134, mailed Nov. 7, 2023, 14 pages.

(Continued)

*Primary Examiner* — Fatoumata Traore
(74) *Attorney, Agent, or Firm* — KDW Firm PLLC; Andrew D. Kasnevich

(57) ABSTRACT

In a method of facilitating encrypted communications between a transmitting system having a unique identifier and a receiving system, a key generation system generates at least one encryption master key for use with the unique identifier and an encryption algorithm to produce a transmitting system-unique encryption key. The key generation system also generates a shared secret master key for use with the unique identifier and a second encryption algorithm to produce a shared secret value. The at least one encryption master key and the shared secret master key are then stored in an encryption information database. The key generation system transmits the at least one encryption master key and shared secret information to the transmitting system and transmits the at least one encryption master key, the shared secret master key and the unique identifier to the receiving data processing system.

20 Claims, 11 Drawing Sheets

(56) References Cited

U.S. PATENT DOCUMENTS

| | | |
|---|---|---|
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |

(56) References Cited

U.S. PATENT DOCUMENTS

| | | |
|---|---|---|
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,582,386 B1 * | 3/2020 | Newman ............... H04W 12/06 |
| 11,228,421 B1 * | 1/2022 | Mesh ..................... G06F 21/36 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |

(56) References Cited

U.S. PATENT DOCUMENTS

| | | |
|---|---|---|
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0247948 A1* | 9/2014 | Goldstein ............ H04R 1/1041 381/58 |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |

(56) References Cited

U.S. PATENT DOCUMENTS

| | | |
|---|---|---|
| 2015/0140960 A1 | 5/2015 | Powell et al. |
| 2015/0154595 A1 | 6/2015 | Collinge et al. |
| 2015/0156176 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0106618 A1* | 4/2020 | Osborn ................. H04L 9/14 |
| 2020/0396078 A1 | 12/2020 | Rule et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 B1 | 2/2012 |
| EP | 2852370 A1 | 3/2015 |
| GB | 2457221 A | 8/2009 |
| GB | 2 516 861 | 2/2015 |
| GB | 2 551 907 | 1/2018 |
| KR | 101508320 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Adams D. and Maier A-K. "Goldbug Big Seven open source crypto-messengers to be compared—or: Comprehensive Confidentiality Review & Audit of GoldBug Encrypting E-Mail-Client & Secure Instant Messenger" Big Seven Study 2016 [online] [retrieved on Mar. 25, 2018]. Retrieved from Internet URL: https://sf.net/projects/goldbug/files/bigseven-crypto-audit. pdf 309 pages.

Author Unknown "EMV Integrated Circuit Card Specifications for Payment Systems Book 2 Security and Key Management" Version 3.4 [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf 174 pages.

Author Unknown "Adaptive Authentication" SecureAuth [online] 2019 [retrieved on Mar. 25, 2019]. Retrieved from Internet URL: https://www.secureauth.com/products/access-management/adaptive-authentication 7 pages.

Author Unknown "Autofill credit cards contacts and passwords in Safari on Mac" Apple Safari User Guide [online] 2019 [retrieved on Mar. 25, 2019]. Retrieved from Internet URL: https://support.apple.com/guide/safari/use-autofill-ibrw1103/mac 3 pages.

Author Unknown "Autofill" Computer Hope [online] 2018 [retrieved on Mar. 25, 2019]. Retrieved from Internet URL: https://www.computerhope.com/jargon/a/autofill.htm 2 pages.

(56) References Cited

OTHER PUBLICATIONS

Author Unknown "Contactless Specifications for Payment Systems" EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf 52 pages.
Author unknown "EMV Card Personalization Specification" EMVCo. LLC. specification version 1.0 (2003) 81 pages.
Author Unknown "Fill out forms automatically" Google Chrome Help [online] 2019 [retrieved on Mar. 25, 2019]. Retrieved from Internet URL: https://support.google.com/chrome/answer/142893?co=GENIE.Platform%3DDesktop&hl=en 3 pages.
Author Unknown "Multi-Factor Authentication" idaptive [online] 2019 [retrieved on Mar. 25, 2019]. Retrieved from Internet URL: https://www.centrify.com/products/application-services/adaptive-multi-factor-authentication/risk-based-mfa/ 10 pages.
Author Unknown "Multiple encryption" Wikipedia [online] 2019 [retrieved on Mar. 25, 2019]. Retrieved from Internet URL: https://en.wikipedia.org/wiki/Multiple_encryption 4 pages.
Author Unknown "NFC Guide: All You Need to Know About Near Field Communication" Square Guide [online] 2018 [retrieved on Nov. 13, 2018]. Retrieved from Internet URL: https://squareup.com/guides/nfc 8 pages.
Author Unknown "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go. html 1 page.
Author Unknown "Triple DES" Wikipedia [online] 2018 [retrieved on Mar. 25, 2019]. Retrieved from Internet URL: https://simple.wikipedia.org/wiki/Triple_DES 2 pages.
Author Unknown "Add Account Updater to your recurring payment tool" [online] 2018-19 [retrieved on Mar. 25, 2019]. Retrieved from Internet URL: https://www.authorize.net/our-features/account-updater/ 5 pages.
Author Unknown "CardrefresherSM from American Express®" [online] 2019 [retrieved on Mar. 25, 2019]. Retrieved from Internet URL: https://merchant-channel.americanexpress.com/merchant/en_us/cardrefresher 2 pages.
Author Unknown "Manage the cards that you use with Apple Pay" Apple Support [online] 2019 [retrieved on Mar. 25, 2019]. Retrieved from Internet URL: https://support.apple.com/en-us/HT205583 5 pages.
Author Unknown "Visa® Account Updater for Merchants" [online] 2019 [retrieved on Mar. 25, 2019]. Retrieved from Internet URL: https://usa.visa.com/dam/VCOM/download/merchants/visa-account-updater-product-information-fact-sheet-for-merchants.pdf 2 pages.
Author Unknown: "onetappayment™" [online] Jan. 24, 2019 [retrieved on Mar. 25, 2019]. Retrieved from Internet URL: https://www.payubiz.in/onetap 4 pages.
Barba R. "Sharing your location with your bank sounds creepy but it's also useful" Bankrate LLC [online] 2017 [retrieved on Mar. 25, 2019]. Retrieved from Internet URL: https://www.bankrate.com/banking/banking-app-location-sharing/ 6 pages.
Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.
Berg G. "Fundamentals of EMV" Smart Card Alliance [online] date unknown [retrieved on Mar. 27, 2019]. Retrieveed from Internet URL: https://www.securetechalliance.org/resources/media/scap13_preconference/02.pdf 37 pages.
Cozma N. "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/ 5 pages.
Davison A. et al. "MonoSLAM: Real-Time Single Camera Slam" IEEE Transactions on Pattern Analysis and Machine Intelligence 29(6): 1052-1067 (2007).
Dhamdhere P. "Key Benefits of a Unified Platform for Loyalty Referral Marketing and UGC" Annex Cloud [online] May 19 2017 [retrieved on Jul. 3, 2019]. Retrieved from Internet URL: https://www.annexcloude.com/blog/benefits-unified-platform/ 13 pages.
Faraj S.T. et al. "Investigation of Java Smart Card Technology for Multi-Task Applications" J of Al-Anbar University for Pure Science 2(1):23 pages (2008).
Haykin M. and Warnar R. "Smart Card Technology: New Methods for Computer Access Control" Computer Science and Technology NIST Special Publication 500-157:1-60 (1988).
Katz J. and Lindell Y. "Aggregate Message Authentication Codes" Topics in Cryptology [online] 2008 [retrieved on Mar. 25, 2019]. Retrieved from Internet URL: https://www.cs.umd.edu/~jkatz/papers/aggregateMAC.pdf 11 pages.
Kevin Android Enthusiast "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag 11 pages.
Krawczyk et al. "HMAC: Keyed-Hashing for Message Authentication" Network Working Group RFC:2104 memo [online] 1997 [retrieved on Mar. 25, 2019]. Retrieved from Internet URL: https://tools.ietf.org/html/rfc2104 12 pages.
Lehpamer H. "Component of the RFID System" RFID Design Principles 2nd edition pp. 133-201 (2012).
Mareli M. et al. "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf 5 pages.
Menghin M.J. "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse 135 pages.
Pierce K. "Is the amazon echo nfc compatible?" Amazon.com Customer Q&A [online] 2016 [retrieved on Mar. 26, 2019]. Retrieved from Internet URL: https://www.amazon.com/ask/questions/Tx1RJXYSPE6XLJD ?_ encodi . . . 2 pages.
Pourghomi P. et al. "A Proposed NFC Payment Application" International Journal of Advanced Computer Science and Applications 4(8):173-181 (2013).
Profis S. "Everything you need to know about NFC and mobile payments" CNET Directory [online] 2014 [retrieved on Mar. 25, 2019]. Retrieved from the Internet URL: https://www.cnet.com/how-to/how-nfc-works-and-mobile-payments/ 6 pages.
Saxena N. "Lecture 10: NMAC HMAC and Number Theory" CS 6903 Modern Cryptography [online] 2008 [retrieved on Mar. 25, 2019]. Retrieved from Internet URL: http://isis.poly.edu/courses/cs6903/Lectures/lecture10.pdf 8 pages.
Song et al. "The AES-CMAC Algorithm" Network Working Group RFC: 4493 memo [online] 2006 [retrieved on Mar. 25, 2019]. Retrieved from Internet URL: https://tools.ietf.org/html/rfc4493 21 pages.
Song F. and Yun A.I. "Quantum Security of NMAC and Related Constructions—PRF domain extension against quantum attacks" IACR Cryptology ePrint Archive [online] 2017 [retrieved on Mar. 25, 2019]. Retrieved from Internet URL: https://eprint.iacr.org/2017/509.pdf 41 pages.
Ullmann et al. "On-Card" User Authentication for Contactless Smart Cards based on Gesture Recognition paper presentation LNI proceedings (2012) 12 pages.
Van den Breekel J. et al. "EMV in a nutshell" Technical Report 2016 [retrieved on Mar. 25, 2019]. Retrieved from Internet URL: https://www.cs.ru.nl/E.Poll/papers/EMVtechreport.pdf 37 pages.
Vu et al. "Distinguishing users with capacitive touch communication" Proceedings of the Annual International Conference on Mobile Computing and Networking 2012 MOBICOM. 10.1145/2348543.2348569.

\* cited by examiner

PARALLEL SECRET SALT GENERATION AND AUTHENTICATION FOR ENCRYPTED COMMUNICATION

FIELD OF THE INVENTION

This disclosure relates generally to cryptography, and more particularly, to systems and methods for cryptographic authentication of communications between data processing systems.

BACKGROUND OF THE INVENTION

Data security and transaction integrity are of critical importance to businesses and consumers. This need continues to grow as electronic transactions constitute an increasingly large share of commercial activity. While data encryption algorithms have improved communication security, vulnerabilities still exist. Symmetric encryption technology, for example, requires that sending and receiving systems must share information and software with one another. The process of communicating such shared information may, itself, be subject to vulnerability.

There is accordingly a need to enhance the integrity of information shared between communication partners that is used for encryption of transaction and other critical communications.

SUMMARY OF THE INVENTION

An illustrative aspect of the invention provides a card comprising a data processor, a communication interface configured for contact or contactless communication with an intermediary processing device, and a card memory. The card memory has stored therein a shared secret master key, a unique card identifier, and a message encryption application. The message encryption application comprises instructions for the data processor to generate a shared secret value using the unique card identifier and the shared secret master key. The application further comprises instructions to generate a message authentication code using the shared secret value, encrypt at least a portion of message content using a first session key to produce encrypted message content, and encrypt the message authentication code. The application also comprises instructions to transmit, to the intermediary processing device for retransmission to a receiving communication processing system, a message comprising the encrypted message content and the encrypted message authentication code.

Another aspect of the invention provides a method of facilitating symmetric encryption communications between a transmitting data processing system having a unique identifier associated therewith and a receiving data processing system. The method comprises generating, by a key generation data processing system, at least one encryption master key. Each encryption master key is configured for use with the unique identifier and a first encryption algorithm to produce a transmitting system-unique encryption key. The method further comprises generating, by the key generation data processing system, a shared secret master key. the shared secret master key is configured for use with the unique identifier and a second encryption algorithm to produce a shared secret value. The method still further comprises storing, by the key generation data processing system, the at least one encryption master key and the shared secret master key in association with the unique identifier in an encryption information database. The method also comprises transmitting, by the key generation data processing system, the at least one encryption master key and shared secret information to the transmitting data processing system and transmitting, by the key generation data processing system, the at least one encryption master key, the shared secret master key, and the unique identifier to the receiving data processing system.

Another aspect of the invention provides a method of authenticating a message transmitted by a sending data processing system having a unique identifier associated therewith, where the transmitted message comprises encrypted content and an encrypted message authentication code. The method comprises actions carried out by a receiving data processing system, including receiving the transmitted message, determining, the unique identifier and retrieving an encryption information record for the sending data processing system. The encryption information record comprises a shared secret master key. The method comprises further actions by the receiving data processing system, including decrypting the encrypted message authentication code, generating a shared secret value using the unique identifier and the shared secret master key, and generating a comparison message authentication code using the shared secret value. The method also comprises comparing, by the receiving data processing system, the comparison message authentication code to the decrypted message authentication code to determine a message authentication result.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

When using symmetric cryptographic algorithms, such as encryption algorithms, hash-based message authentication code (HMAC) algorithms, and cipher-based message authentication code (CMAC) algorithms, it is important that the key(s) used remain secret between the party that originally processes the data that is protected, and the party who receives and further processes the data. It is also important that such values not be used too many times. Each time a key or salt is used, it provides an attacker an additional sample of data which was processed by the cryptographic algorithm. The more data an attacker obtains that has been processed with the same key or salt, the greater the likelihood that the attacker may discover these secret values.

Additional protection may be provided through the use of a message authentication code generated based at least in part on a secret value (sometimes referred to herein as a salt or secret salt) that may be included with an encrypted message. As with the information necessary to generate the session key or keys used for symmetric cryptography, the secret value used to create the MAC must be shared by the sender and the recipient. Typically, this means permanent or long-term storage and association of the shared value in each of the two systems. It also means that at some point, the shared values must be transmitted from one of the communication participants to the other or from a third party administrating entity to both participants. Such transmissions provide a potential weak spot before any encrypted messages have even passed between the sender and receiver.

Example embodiments of the present invention provide systems and methods for symmetric cryptographic communication that incorporates message authentication using a shared secret value that may be dynamically generated by either or both of the sending and receiving systems. Not only does this provide the security of not maintaining the secret value in memory, it also provides the benefit that information usable to generate the secret value may be securely transmitted to either or both systems without the need to transmit the shared value itself. This has particular value when one of the two systems includes or is closely associated with a system configured for generation and control of the secret value. A particular example of this type of scenario is when one of the two communicating processing systems is incorporated into a transaction card programmed and issued by a card issuing authority and the second communicating processing system is part of a transaction processing system.

Figure 1:
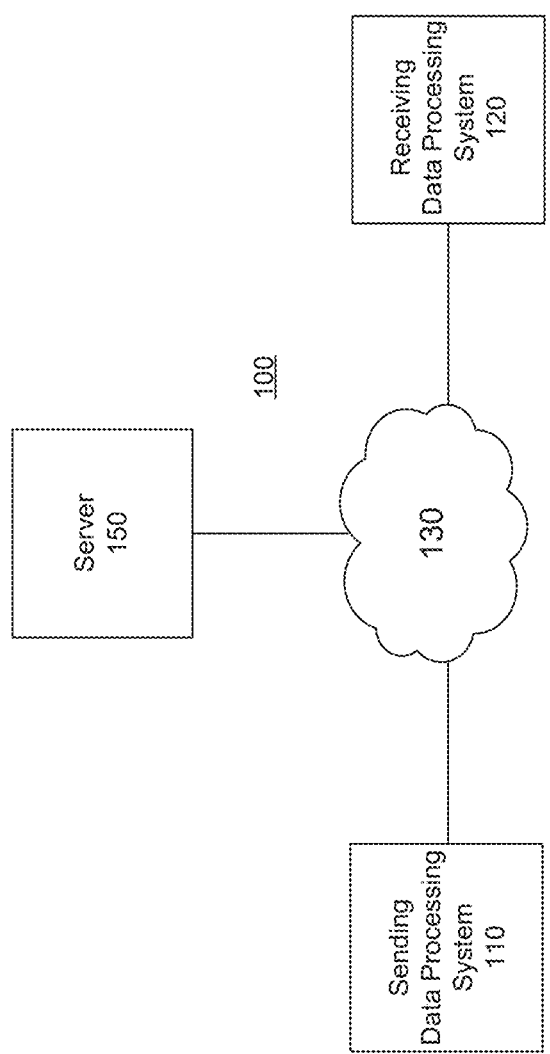
FIG. 1 is a schematic representation of a data transmission system usable in implementing embodiments of the invention.

With reference to FIG. 1, a data transmission system 100 according to an example embodiment may include a transmitting or sending data processing system 110, a receiving or recipient data processing system 120 in communication with one another and with one or more servers 150 via a network 130. The processing systems 110, 120 may be or include any network-enabled processor computer system or device including, but not limited to, any server, network appliance, personal computer (PC), workstation, mobile processing device such as a smart phone, smart pad, handheld PC, or personal digital assistant (PDA), or card-mounted micro-processor capable of direct or indirect network communication.

The network 130 may be or include a wireless network, a wired network or any combination of wireless network and wired network, and may be configured to connect one or more transmitting systems 110 and one or more receiving systems 120 to the server 150. The network 130 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 130 may include, without limitation, telephone lines, fiber optics, IEEE Ethernet 902.3, a wide area network (WAN), a wireless personal area network, a local area network (LAN), or a global network such as the Internet. In addition, the network 130 may support an Internet network, a wireless communication network, a cellular network, or the like, or any combination thereof. The network 130 may further include one network, or any number of the exemplary types of networks mentioned above, operating as a stand-alone network or in cooperation with each other. The network 130 may utilize one or more protocols of one or more network elements to which they are communicatively coupled. The network 130 may translate to or from other protocols to one or more protocols of network devices. Although the network 130 is depicted as a single network, it should be appreciated that according to one or more examples, the network 130 may comprise a plurality of interconnected networks, such as, for example, the Internet, a service provider's network, a cable television network, corporate networks, such as credit card association networks, and home networks.

The network-enabled computer systems used to carry out the methods contemplated by the invention may execute one or more software applications to, for example, receive data as input from an entity accessing the network-enabled computer system, process received data, transmit data over a network, and receive data over a network. The one or more network-enabled computer systems may also include one or more software applications to send notifications to an account holder or other user. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

In some examples, one or more transmitting systems 110 and one or more receiving systems 120 may be configured to communicate with each other and/or the server 150 without passing through network 130. For example, communication between the transmitting system 110 and the receiving systems 120 and/or the server 150 may occur via at least one of near field communication, Bluetooth, radio frequency identification, Wi-Fi, and/or the like. In some examples, either or both of the transmitting system 110 and the receiving system 120 may comprise multiple devices capable of communication with one another via the network 130, via another network, or via near field communication Bluetooth, radio frequency identification, Wi-Fi, and/or the like.

In typical usage scenarios for the system 100, a sender and a recipient may desire to exchange data (e.g., original sensitive data) via the respective systems 110 and 120. While the following example refer specifically to the two systems 110, 120, it will be understood that additional transmitting systems and receiving systems may be involved and that the roles of transmitting and receiving may, in some instances, be reversed. The primary requirement for participation, however, is that each party shares a secret master key that can be used to produce a symmetric encryption key. In some examples, the transmitting system 110 and receiving system 120 may be provisioned with the secret master key. It will be understood that any other party or device that can generate or that is provided with the symmetric encryption key may perform the functions of the transmitting system 110 or the receiving system 120. In typical examples, however, the symmetric encryption key is a session key that is kept secret from all parties other than the transmitting system 110 and the receiving system 120 involved in exchanging the secure data.

In methods of the invention, the transmitting system 110 and the receiving system 120 may also be required to maintain or generate a shared secret value that can be used to generate a message authentication code. As will be discussed in more detail hereafter, the shared secret value may, in some embodiments, be dynamically generated by one or both systems using a shared secret master key.

For preparing an encrypted transmission, the transmitting system 110 may be configured to use an appropriate symmetric cryptographic algorithm to establish a secret session key using the secret master key. The symmetric algorithm used may comprise any symmetric cryptographic algorithm capable of generating a desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

In some embodiments, additional parameters available to both the transmitting system 110 and the receiving system 120 may be used in the construction of the shared symmetric session key. One example would be a counter that is updated each time a communication from the transmitting system 110 to the receiving system 120 is encrypted and transmitted. In some embodiments, the counter or other parameter may be included in the encrypted transmission and/or included in an unencrypted attachment with the encrypted transmission.

The transmitting system 110 may be configured to use the constructed symmetric encryption session key to process some or all of a set of information for transmission to the receiving system 120. For example, the transmitting system 110 may encrypt a sensitive portion of data using a symmetric encryption algorithm and the session key, with the output comprising an encrypted information set. The transmitting system 110 may then transmit a message comprising the encrypted information set. The message may also include non-encrypted information, which may include, for example information identifying the transmitting system and/or information relating to the nature of the encrypted information set. In particular embodiments, additional communication parameters (e.g., a counter) may be included.

In particular embodiments, the sensitive data portion encrypted using the session key may include a message authentication code generated using a shared secret value. In some embodiments, the transmitting system 110 may be provisioned with an assigned shared secret value that may be stored in a memory included in or accessible by the transmitting system 110. The transmitting system 110 may be configured to retrieve the stored shared secret value from memory when constructing a message for transmission to the receiving system 120. The shared secret value can then be used as a salt value in any known cryptographic algorithm to generate the message authentication code. In some embodiments, the transmitting system 110 may be provisioned with a shared authentication key that can be used with the shared secret value in the cryptographic algorithm to produce the message authentication code. In other embodiments, the transmitting system may instead be provisioned with a shared authentication master key that can be used to dynamically produce the shared authentication key when needed. The resulting shared authentication key may then be used with the shared secret value in the cryptographic algorithm to produce the message authentication code. One or more other shared or determinable communication parameter (e.g., the above-described counter) may be used to generate the shared authentication key, the message authentication code, or both.

In some embodiments, the transmitting system 110 is not provided with a static shared secret value, but is instead provided with a shared secret master key that can be used to dynamically generate the shared secret value when needed. The shared secret master key may be stored in a memory included in or accessible by the transmitting system 110 at the time a message is to be constructed. At such time, the transmitting system 110 may retrieve the shared secret master key and combine it with one or more fixed parameters (e.g., a fixed identifier or account associated with the transmitting system 110) and/or one or more variable parameters (e.g., an encrypted transmission counter) in an encryption algorithm to produce the shared secret value. The resulting shared secret value may then be used to construct the message authentication code as described above.

Once generated, the message authentication code may be added to the sensitive data portion of the message to be transmitted prior to encryption of the sensitive data portion with the symmetric key. Alternatively, the message authentication code may be separately encrypted to produce a message authentication code cryptogram that may be added to the message prior to transmission. The transmitting system 110 may then transmit the message comprising the encrypted and non-encrypted information to the receiving system 120.

The receiving system 120 may be configured to receive and process the message transmitted by the transmitting system 110. This may include initially processing the unencrypted information, which, as previously discussed, may include information sufficient for the receiving system 120 to identify the transmitting system 110. It may also include deriving one or more communication parameters that may be included for use in decrypting the encrypted message information. In particular embodiments, the receiving system 120 may be configured to determine the symmetric session key used to encrypt the encrypted message information. As discussed above, the receiving system 120 may be provisioned with the same secret master key as was the transmitting system. Accordingly, the receiving system 120 may be configured to use the same symmetric cryptographic algorithm as the transmitting system to establish the secret session key using the secret master key. In embodiments where additional parameters are used in the construction of the session key, the receiving system may also be configured to determine such parameters. In some embodiments, one or more such parameters may be included in the unencrypted portion of the received message. In other embodiments, parameters such as an encrypted communication counter may be determined in parallel by the receiving system 120.

The receiving system 120 may be further configured to use the constructed symmetric encryption session key to decrypt the encrypted portion of the message. In embodiments, where the message authentication code is included as an attached cryptogram, the receiving system 120 may also separately decode this cryptogram. In either case, the receiving system 120 may be further configured to authenticate the received message using the decrypted method authentication code. To accomplish this, the receiving system 120 may retrieve or generate a shared secret value associated by the receiving system with the transmitting system 110. In some embodiments, the receiving system 120 may have a static shared secret value associated with identification information for the transmitting system 110 or an account associated with the transmitting system. In such embodiments, the receiving system 120 may use identification information provided in the received message to retrieve the shared secret value from a database stored in or accessible by the receiving system 120. In other embodiments, the receiving system 120 may instead be required to generate the shared secret value using a copy of the shared secret master key. In such embodiments, the receiving system 120 may use the transmitting system identification information to retrieve the shared secret master key rather than the shared secret itself. The receiving system 120 may then use the shared secret master key to produce a shared secret value in the same manner as the transmitting system 120.

The resulting shared secret value may then be used as a salt value to generate a confirmation message authentication code using the same encryption algorithm as used by the transmitting system 110. In some embodiments, the receiving system 120 may retrieve from storage a shared authentication key that can be used with the shared secret value in the cryptographic algorithm to produce the confirmation message authentication code. In other embodiments, the receiving system 120 may instead retrieve a shared authentication master key associated with the transmitting system 110 or account associated with the transmitting system 110. The shared authentication master key can then be used to produce the shared authentication key. The resulting shared authentication key may then be used with the shared secret value in the cryptographic algorithm to produce the confirmation message authentication code. Depending on the embodiment, one or more other shared or determinable communication parameter (e.g., the above-described counter) may be used to generate the shared authentication key, the confirmation message authentication code, or both. Once generated, the confirmation message authentication code may be compared to the decrypted message authentication code to authenticate the message.

Figure 2:
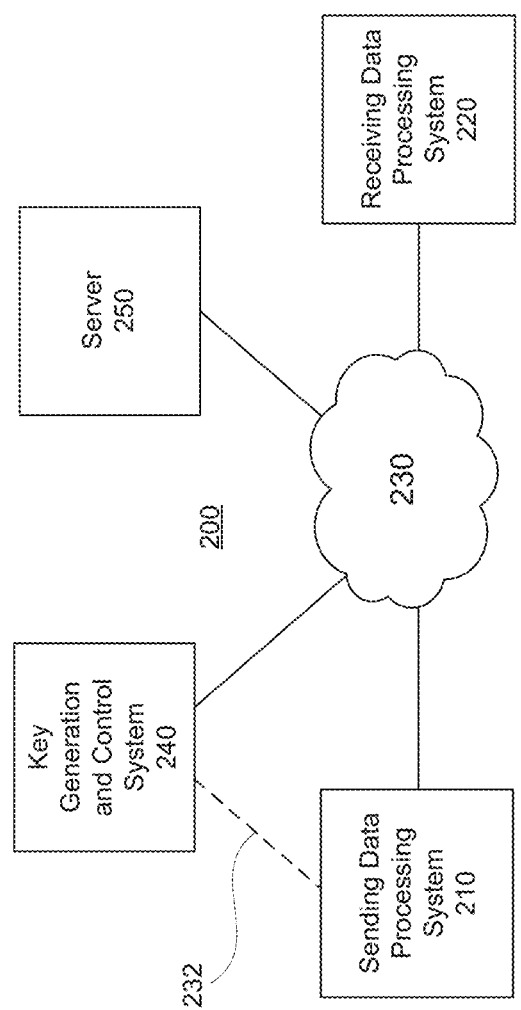
FIG. 2 is a schematic representation of a data transmission system usable in implementing embodiments of the invention.

With reference to FIG. 2, a data transmission system 200 according to an example embodiment may include a transmitting or sending data processing system 210, a receiving or recipient data processing system 220 in communication in communication with one another and with one or more servers 250 via a network 230. The system 200 also includes a key generation and control system 240 configured for communication over the network 230. The sending and receiving data processing systems 210, 220 may each be or include any network-enabled processor computer system or device including, but not limited to, any server, network appliance, personal computer (PC), workstation, mobile processing device such as a smart phone, smart pad, handheld PC, or personal digital assistant (PDA), or card-mounted micro-processor capable of direct or indirect network communication.

The network 230 may be or include a wireless network, a wired network or any combination of wireless network and wired network, and may be configured to connect one or more transmitting systems 210 and one or more receiving systems 220 to the server 250. The network 230 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 230 may include, without limitation, telephone lines, fiber optics, IEEE Ethernet 902.3, a wide area network (WAN), a wireless personal area network, a local area network (LAN), or a global network such as the Internet. In addition, the network 230 may support an Internet network, a wireless communication network, a cellular network, or the like, or any combination thereof. The network 230 may further include one network, or any number of the exemplary types of networks mentioned above, operating as a stand-alone network or in cooperation with each other. The network 230 may utilize one or more protocols of one or more network elements to which they are communicatively coupled. The network 230 may translate to or from other protocols to one or more protocols of network devices. Although the network 230 is depicted as a single network, it should be appreciated that according to one or more examples, the network 230 may comprise a plurality of interconnected networks, such as, for example, the Internet, a service provider's network, a cable television network, corporate networks, such as credit card association networks, and home networks.

In some examples, one or more transmitting systems 210 and one or more receiving systems 220 may be configured to communicate with each other, the key generation and control system 240, and/or the server 250 without passing through network 230. For example, the key generation and control system 240 may be configured for communication with the sending data processing system 210 via communication link 232, which may be or include one or more of a private network, near field communication, Bluetooth, radio frequency identification, Wi-Fi, and the like.

In various embodiments, the transmitting and receiving data processing systems 210, 220 may be similar to those described above in relation to the data transmission system 100. In particular, the transmitting data processing system 210 and the receiving data processing system 220 may each be configured for retrieval or production of a shared encryption key usable for generation of a shared session key for encryption and decryption of message content for transmission over the network 230. Further, the transmitting data processing system 210 and the receiving data processing system 220 may each be configured for retrieval or production of a shared secret and retrieval and production of a shared authentication key, the shared secret and the shared authentication key being usable to generate a message authentication code.

In the system 200, however, some or all of the master keys used to produce the parameters specific to the generation of a shared session key for a particular communication may be produced and shared by the key generation and control system 240. In exemplary embodiments, the key generation and control system 240 may be configured to generate one or more of a encryption master key, a shared secret master key, and an authentication master key. Each of these may be associated with identification information for the transmitting system 210 or an account associated with the transmitting processing system 210. In some embodiments, any or all of these keys may then be transmitted to the transmitting processing system 210, which stores them for future use in generating encrypted communications. In some embodiments, however, the key generation and control system 240 may use the shared secret master key and a transmitting system identifier to generate a shared secret, which is then sent to or directly saved to memory in the transmitting system 210. In particular embodiments, the key generation and control system 240 may communicate one or more master keys and/or the shared secret to the transmitting data processing system 210 via the private communication link 232. In some examples, this may be accomplished during a system provisioning process. In some embodiments, the key generation and control system 240 may associate each master key with a plurality of transmitting data processing systems 210 and their unique identifiers. In this way, a single shared secret master key can be combined with any one of the multiple transmitting system identifiers to produce a transmitting system-unique shared secret.

The key generation and control system 240 may transmit over the network 230 any or all of the encryption master key, shared secret master key, and authentication master key along with identification information for the sending data processing system 210. The receiving data processing system(s) 220 may then store the one or more keys and the identification information in an accessible data storage. In a particular example, the key generation and control system 240 may transmit a copy of the shared secret master key and an identifier for the transmitting data processor to a receiving data processor 220, which may place them in storage. The receiving system 220 may be configured to, upon receiving a message with encrypted information from the transmitting system 210, generate a session key and decrypt the encrypted portion of the message, retrieve the shared secret master key and use it with the identifier (or other identifying information as appropriate) to generate the shared secret and, in turn, a confirmation message authentication code for comparison to a decrypted message authentication code from the received message.

The system 200 provides a basis for authenticating a message using a shared secret without requiring that the entity tasked with provisioning a sending system to transmit the shared secret to potential receiving systems in the clear.

As previously discussed, this approach may be of particular value in the area of card-based transactions. In this area, the sending/transmitting processing system may be a card-mounted microprocessor and the receiving processing system may be a reception/authentication gateway for a card transaction processing system.

With reference to FIGS. 3-8, a transaction card communication system 300 includes a transaction card 320 associated with a user account. The transaction card 320 may be one of a plurality of cards distributed by a card issuer for use in conducting financial transactions through one or more transaction processing entities. The system 300 includes a card issuer processing system 350 administered by the card issuer and one or more card message processing systems 360 administered by the one or more transaction processing entities. The system 300 may also include one or more user devices 310 each associated with a user who may be associated with the user account. The system 300 may also include one or more transaction processing machines 340 configured for facilitating financial transactions involving the transaction card 320. Each of the user device 310, transaction processing machines 340, card issuer processing system 350 and card message processing system 360 may be or include a network-enabled data processing system configured for selective communication over a network 330.

The network 330 may be or include a wireless network, a wired network or any combination of wireless network and wired network, and may be configured to connect one or more transmitting systems (e.g., user device 310 and transaction processing machine 340) and one or more receiving systems (e.g., card message processing system 360) to various servers and systems (e.g., card issuer processing system 350). The network 330 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 330 may include, without limitation, telephone lines, fiber optics, IEEE Ethernet 902.3, a wide area network (WAN), a wireless personal area network, a local area network (LAN), or a global network such as the Internet. In addition, the network 330 may support an Internet network, a wireless communication network, a cellular network, or the like, or any combination thereof. The network 330 may further include one network, or any number of the exemplary types of networks mentioned above, operating as a stand-alone network or in cooperation with each other. The network 330 may utilize one or more protocols of one or more network elements to which they are communicatively coupled. The network 330 may translate to or from other protocols to one or more protocols of network devices. Although the network 330 is depicted as a single network, it should be appreciated that according to one or more examples, the network 330 may comprise a plurality of interconnected networks, such as, for example, the Internet, a service provider's network, a cable television network, corporate networks, such as credit card association networks, and home networks.

Figure 3:
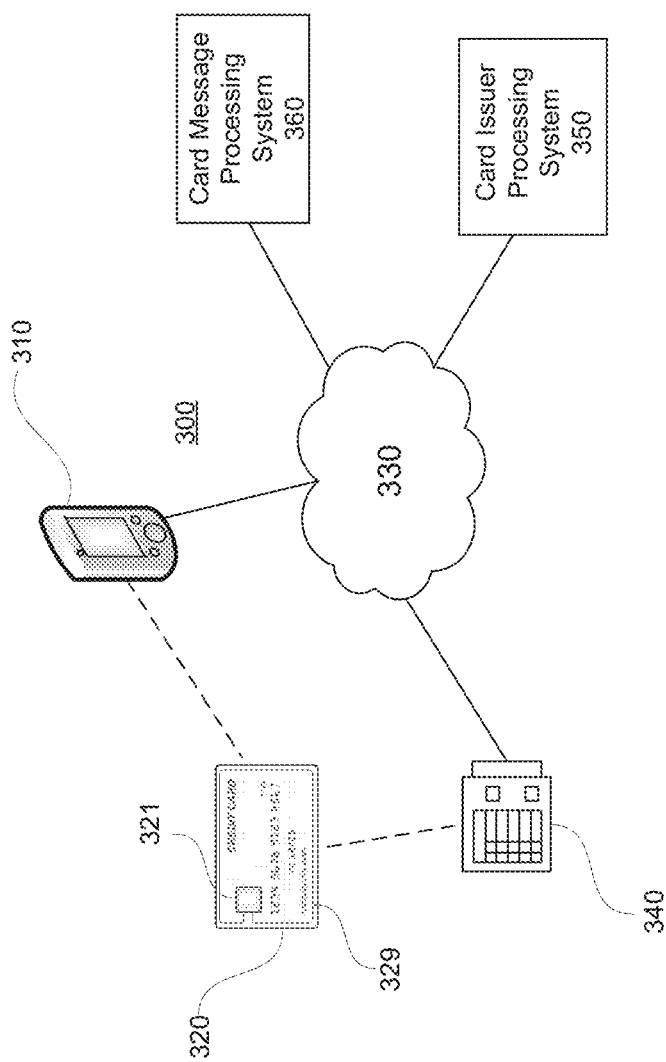
FIG. 3 is a schematic representation of a transaction card communication system according to an embodiment of the invention.
Figure 4:
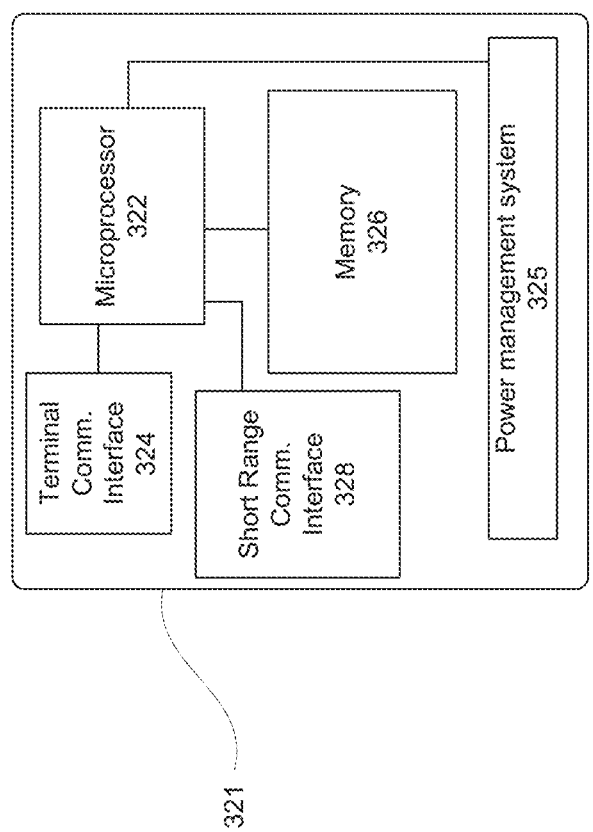
FIG. 4 is a schematic representation of a transaction card data processing system usable in implementing embodiments of the invention.

The transaction card 320 used in embodiments of the invention may include chip-carrying transaction cards ("smart" cards) having electrical and/or near field or other short range communication capabilities. As illustrated in FIGS. 3 and 4, a typical transaction card 320 that is usable in various embodiments of the invention is a smart card with a microprocessor chip 321. The microprocessor chip 321 includes processing circuitry for storing and processing information, including a microprocessor 322 and a memory 326, and may also include a power management system 325. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 320 is configured for communication with transaction processing machines and other devices via a terminal communication interface 324. The interface 324 and the microprocessor 322 may, in particular, be configured for establishing communication with merchant transaction processing devices 340 for carrying out purchase and other transactions. The communication interface 324 may be configured to provide for contact-based communication, in which case the interface 324 may have electrical circuitry and contact pads on the surface of the card 320 for establishing direct electrical communication between the microprocessor 322 and the processing circuitry of a transaction terminal 340. Alternatively or in addition, the first communication interface 324 may be configured for contactless communication with the transaction terminals 340. In such embodiments, the communication interface 324 may be or include an NFC communication interface configured for communication with other NFC communication devices when the card 320 is within a predetermined NFC range. The communication interface 324 and the microprocessor 322 may also be configured for establishing NFC communication with the user device 310. In some embodiments, the microprocessor chip 321 may include a second communication interface 328 configured for establishing short range communication with a user device 310 via Bluetooth, or other short range communication methodology. In such embodiments, the transaction card 320 may have a short range communication antenna 329 that is included in or connected to the short range communication interface 328.

In particular embodiments, the transaction card 320 may be Bluetooth enabled using the microprocessor chip 321, the second communication interface 328 and the antenna 329. A Bluetooth-enabled transaction card may support Bluetooth Low Energy (BLE) and may be paired to the user device 310. In some embodiments, pairing and communications may be established between the transaction card 320 and other interfacing devices, such as a terminal (not shown), a merchant transaction processor 340, and the like. A Bluetooth-enabled device may include the capabilities to establish a link between a card and the device (or pair the devices) using device settings (e.g., iOS or Android settings that manage Bluetooth connections) and/or mobile application(s) associated with the card issuer that can cooperate with the device controls to manage a Bluetooth connection with the card 320.

The memory 326 may be a read-only memory, write-once read-multiple memory or read/write memory, e.g., RAM, ROM, and EEPROM, and the chip 321 may include one or more of these memories. The memory 326 may have stored therein information associated with a transaction card account. In some embodiments, the memory 326 may have permanently stored therein a unique alphanumeric identifier associated with the account. It may also have permanently stored public and private card encryption keys. In some embodiments, the private and public encryption keys may be permanently hard-wired into the card memory.

The memory 326 may be configured to store one or more software applications for execution by the microprocessor 322. In particular embodiments, the card memory 326 has stored therein a transaction processing application configured for carrying out a financial transaction at a merchant terminal 340 or through the user device 310. The application includes instructions for the microprocessor 322 to establish communication with the transaction terminal 340 or the user device 310. For transaction terminal interactions, communication may be established upon introduction of the transaction card 320 to the transaction terminal 340 by insertion of the card 320 for electrical contact, by bringing the card 320 within NFC communication range of the transaction terminal 340, or by tapping the transaction card 320 to the transaction terminal 340. For user device interactions, communication may be established by bringing the card 320 within NFC communication range of the user device 310, or by tapping the transaction card 320 to the user device 310. The application instructions may be configured to cause the microprocessor 322 to receive via the first communication interface 324 information relating to the financial transaction from the transaction terminal 340. Such transaction information may include the type of transaction (e.g., purchase, refund, transfer, account payment, etc.) and a monetary value. The transaction information could also include information about the terminal 340 and/or the entity managing the terminal 340. Such information could include, for example, a terminal or merchant identifier and/or location information.

In various embodiments, the memory 326 may have stored therein instructions for generating encrypted communications for transmission to a remote card message professing system 360 via an intermediate network-enabled device such as a user device 310 or transaction processing machine 340. In particular examples, these instructions may be configured to construct a transaction message having an encrypted portion and a non-encrypted portion and including a message authentication code.

For preparing the transaction message, an application may be configured to make use of a card-unique key (referred to herein as a unique derived key or UDK) and an appropriate symmetric cryptographic algorithm to establish a secret session key for encryption of a sensitive message content. In some embodiments, the UDK may be stored in the memory 326, from which it can be retrieved for use. In other embodiments, the UDK may be produced when needed using a UDK master key retrieved from the memory 326 and a card identifier retrieved from the memory 326. In some embodiments, additional parameters may be used in the construction of the shared symmetric session key. One example would be a counter that is updated each time an encrypted communication for the card message processing system 360 is encrypted and transmitted. In some embodiments, the counter or other parameter may be included in the encrypted transmission and/or included in an unencrypted attachment with the encrypted transmission.

The symmetric algorithm used may comprise any symmetric cryptographic algorithm capable of generating a desired length diversified symmetric key. Non-limiting examples of the symmetric algorithm may include a symmetric encryption algorithm such as 3DES or AES128; a symmetric HMAC algorithm, such as HMAC-SHA-256;

and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

The encrypting application may be configured to use the constructed symmetric encryption session key to process some or all of a set of information for transmission to the card message processing system 360. For example, the microprocessor 322 may encrypt a sensitive portion of data using a symmetric encryption algorithm and the session key, with the output comprising an encrypted information set. The microprocessor may then transmit, via the terminal communication interface 324 or the short range communication interface 328, a message comprising the encrypted information set to be relayed on to the card message processing system 360 via the network 330. The message may also include non-encrypted information, which may include, for example, a card identifier and/or information relating to a transaction. In particular embodiments, additional communication parameters (e.g., a counter) may be included.

In particular embodiments, the transaction message may include a message authentication code generated using a shared secret value. In some embodiments, the card 320 may be provisioned with an assigned shared secret value that may be stored in the memory 326 upon card issuance. The encrypting application may be configured to retrieve the stored shared secret value from the memory 326 when constructing a message for transmission to the card message processing system 360. The shared secret value can then be used as a salt value in any known cryptographic algorithm to generate the message authentication code. In some examples, one or more other shared or determinable communication parameters (e.g., an encrypted communication counter) may be used with the shared secret value to generate the message authentication code.

In some embodiments, the transaction card 320 is not provided with a static shared secret value, but is instead provided with a shared secret master key that can be used to dynamically generate the shared secret value when needed. The shared secret master key may be stored in the memory 326 at the time of provisioning of the transaction card 320. The encrypting application may be configured to retrieve the shared secret master key and combine it with a card identifier or other fixed card parameter in an encryption algorithm to produce the shared secret value. The resulting shared secret value may then be used to construct the message authentication code. In some examples, one or more other shared or determinable communication parameters (e.g., an encrypted communication counter) may be used with the shared secret master key and the card identifier to generate the shared secret.

In some examples, the message authentication code may be included in the sensitive data portion encrypted using the session key discussed above. In some embodiments, however, the message authentication code may be separately encrypted to produce a card authentication code cryptogram that can be appended to the message. In some embodiments, this cryptogram may be produced using the same session key as is used to encrypt the sensitive portion of the message. In other embodiments, however, the message authentication code may be encrypted using a second shared session key produced using a second UDK. The second UDK may be stored in the memory 326 upon provisioning of the card 320 or the second UDK may be dynamically produced when needed from a second UDK master key stored in the card memory 326. In either case, the second UDK may be combined with the card identifier to produce the second session key, which can be used to encrypt the message authentication code to produce the message authentication code cryptogram. The cryptogram may then be appended to the transaction message, which may then be transmitted to the card message processing system 360

Figure 5:
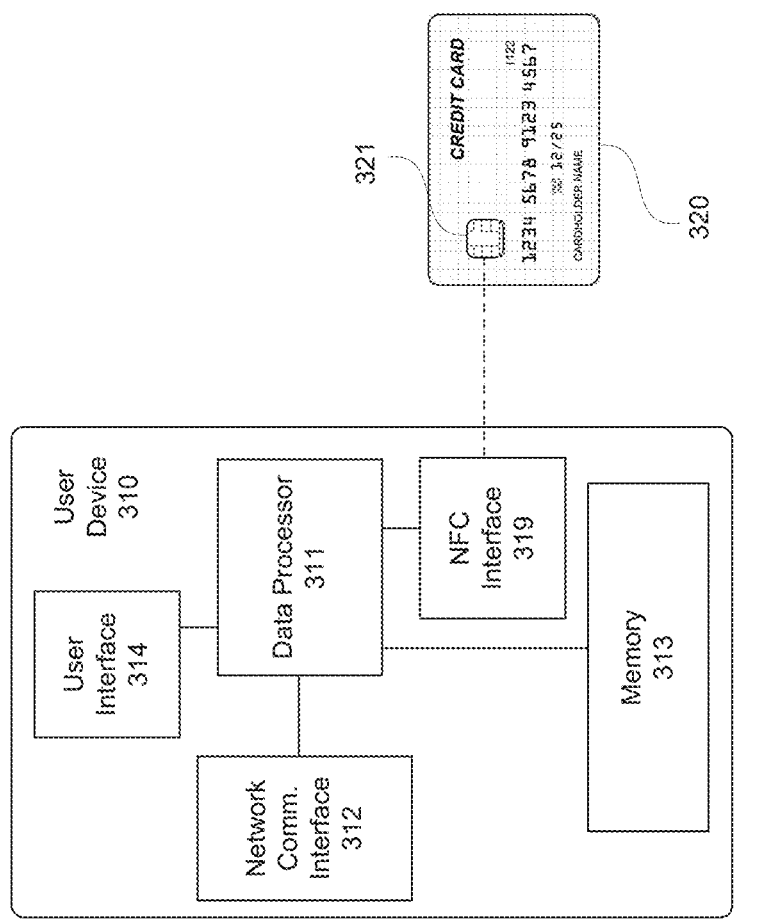
FIG. 5 is a schematic representation of a user device usable in implementing embodiments of the invention.

With reference to FIG. 5, an account holder or user device 310 may be any network-enabled data processing and/or communication device that an account holder uses to carry out a transaction and/or to receive notifications from a transaction processor including, but not limited to a smartphone, a laptop, a desktop computer, and a tablet. In particular embodiments, the account holder device 310 includes an on-board data processor 311 in communication with a memory module 313, a user interface 314, and a network communication interface 312. In some embodiments, the account holder device 310 may include an image capturing device (e.g., a digital camera). The data processor 311 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 313 can be a read-only memory, write-once read-multiple memory or read/write memory, e.g., RAM, ROM and EEPROM, and the user device 310 can include one or more of these memories.

The user interface 314 includes a user input mechanism, which can be any device for entering information and instructions into the account holder device 310, such as a touch-screen, keyboard, mouse, cursor-control device, microphone, stylus, or digital camera. The user interface 314 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 312 may be configured to establish and support wired or wireless data communication capability for connecting the device 310 to the network 330 or other communication network. The user device 310 may also have an NFC communication interface 319 that can be configured to support short-range wireless communications such as near field communication (NFC), radio-frequency identification, and Bluetooth. The NFC interface 319 may, in particular, be configured for establishing near field communication with the data processing chip 321 on board the transaction card 320 and for receiving information transmitted by the data processing chip 321 via the chip NFC interface 324.

In embodiments of the invention, the memory 313 may have stored therein one or more applications usable by the data processor 311 to conduct and/or monitor transactions between the user device 310, the transaction processing machines 340, and other transaction processing systems. These applications may include instructions usable by the data processor 311 to identify transaction events, store event data in the memory 313, and communicate event data. In some embodiments, they may include instructions for receiving transaction messages from the transaction card 320 and transmit such messages to a card message processing system 360 over the network 330. The application may be configured to instruct the data processor 311 to interpret some or all of the unencrypted portion of a message.

Figure 6:
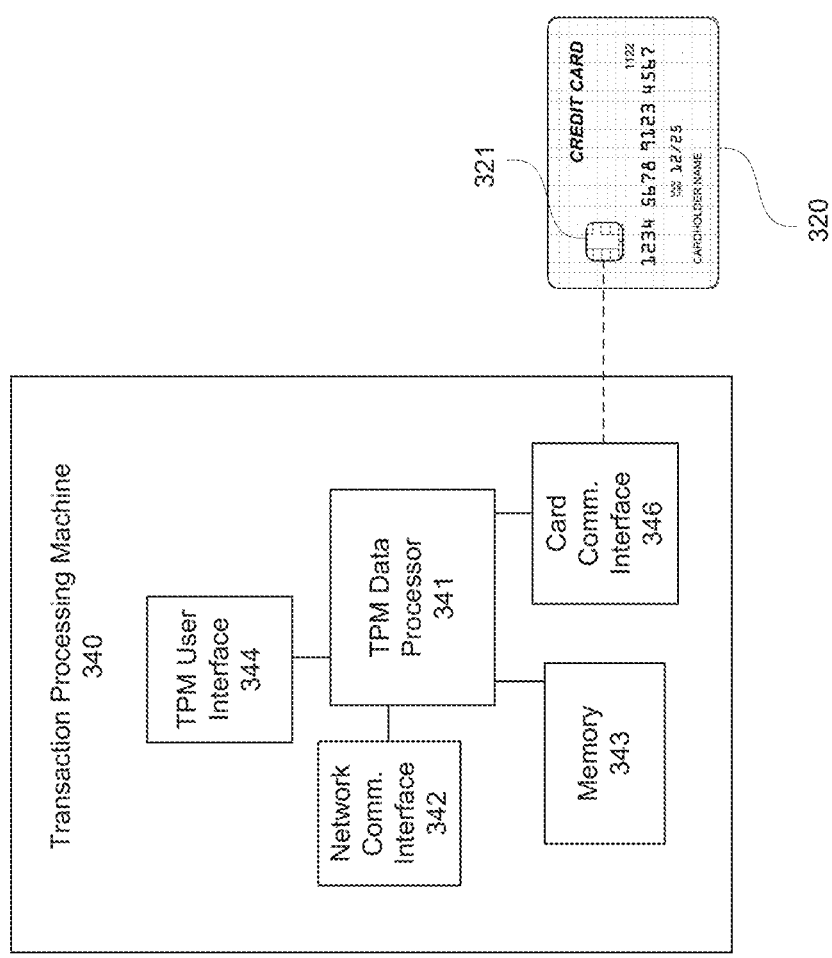
FIG. 6 is a schematic representation of a transaction processing machine usable in implementing embodiments of the invention.

With reference to FIG. 6, the transaction processing machine (TPM) 340 may be any network enabled processor configured for processing a transaction involving a transaction card 320. The TPM 340 may be, for example, a cash register, automated teller machine, vending machine, or other POS terminal that is capable of communicating with the transaction card 320 and is capable of communicating with the card message processing system 360 via the network 130. In some embodiments, the TPM 340 may include a TPM data processor 341, a network communication interface 342, a TPM user interface 344, a memory 343, and a card communication interface 346.

The TPM data processor 341 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 343 can be a read-only memory, write-once read-multiple memory or read/write memory, e.g., RAM, ROM and EEPROM, and the transaction processing machine 340 can include one or more of these memories.

The TPM user interface 344 may includes a user input mechanism, which can be any device for entering information and instructions into the TPM 340, such as a touchscreen, keyboard, mouse, cursor-control device, microphone, stylus, or digital camera. The user interface 344 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 342 may be configured to establish and support wired or wireless data communication capability for connecting the machine 340 to the network 330 or other communication network. The card communication interface 346 may be configured for receiving the transaction card 320 and making electrical contact for wired communication between the TPM data processor 341 and the transaction card processor 321. Alternatively or in addition, the card communication interface 346 may be configured to support short-range wireless communications between the transaction card 320 and the TPM data processor such as near field communication (NFC), radio-frequency identification, and Bluetooth. The card communication interface 346 may, in particular, be configured for establishing wired or wireless communication with the data processing chip 321 on board the transaction card 320 and for receiving information transmitted by the data processing chip 321 via the chip terminal communication interface 324.

In embodiments of the invention, the TPM memory 343 may have stored therein one or more applications usable by the data processor 341 to conduct transactions and to communicate with a transaction processing system. These applications may include instructions usable by the data processor 341 to identify transaction events, store event data in the memory 343, and communicate event data. In some embodiments, they may include instructions for receiving transaction messages from the transaction card 320 and transmitting such messages to a card message processing system 360 over the network 330. The application may be configured to instruct the data processor 341 to interpret some or all of the unencrypted portion of a message.

The card issuer processing (CIP) system 350 may be associated with a transaction card issuing authority that may provision and distribute large numbers of transaction cards 320 with each such card 320 being associated with one or more user accounts. The card issuing authority may be or may be directly associated with the administrator of such user accounts or may be a separate contracting entity. In either case, the card issuing authority may make use of the card issuer processing system 350 for provisioning the transaction cards 320 with applications and data for carrying out secure communication according to embodiments of the invention.

Figure 7:
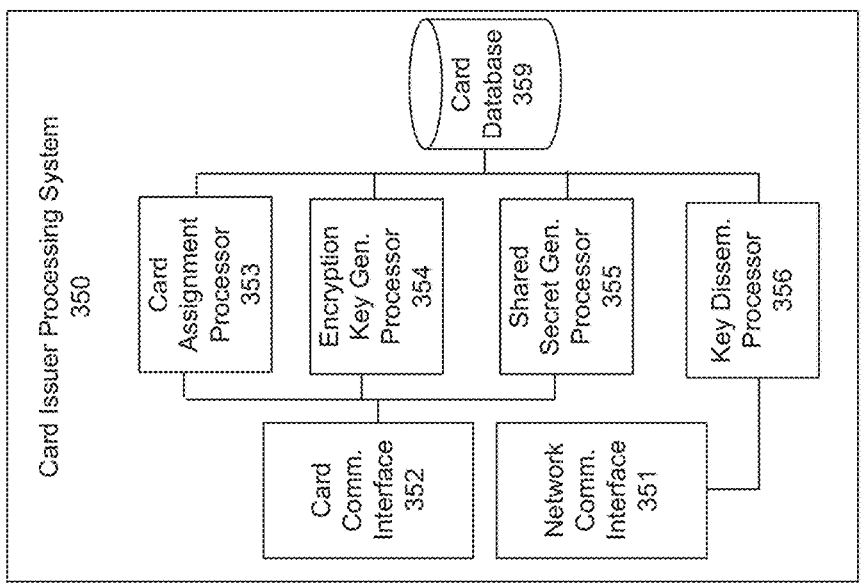
FIG. 7 is a schematic representation of a card issuer processing system according to an embodiment of the invention.

With reference to FIG. 7, the CIP system 350 is a network-enabled automated data processing system that may include a card assignment processor 353, an encryption key generation processor 354, a shared secret generation processor 355, and a key dissemination processor 356. The CIP system 350 may also include a card communication interface 352 configured for wired or wireless communication with a transaction card 320 and a network communication interface 351 configured to establish communication with the network 330 and/or other networks. In some embodiments, the CIP system 350 may include a card database 359. In other embodiments, a card database 359 may be separate from, but accessible by the CIP system 350.

The card communication interface 352 is configured to allow one or more of the provisioning processors 353, 354, 355 to pass information directly into the memory 326 of a transaction card 320. This may be accomplished by direct electrical/data communication via electrical contacts on the card chip 321. Alternatively or in addition, the card communication interface 352 may be configured for contactless communication with the card chip 321 via the card's terminal communication interface 324 or short range communication interface 328. In such embodiments, the card communication interface 352 may be or include an NFC communication interface configured for communication when the card 320 is within a predetermined NFC range. The card communication interface 352 may also be configured for establishing short range communication via Bluetooth, or other short range communication methodology.

The CIP system 350 may include one or more automated data processors configured for provisioning the microprocessor chip 321 of a plurality of transaction cards 320. In some embodiments, this may include a card assignment processor 353 configured to establish wired or wireless communication with the chip 321 of a card 320 via the card communication interface 352. The card assignment processor may be further configured to generate or otherwise determine one or more card identifiers for the card 320 and to transmit for storage or otherwise permanently store the one or more card identifiers in the memory 326 of the card 320. The card assignment processor 353 may also store the one or more identifiers in a record in the card database 359.

The one or more automated data processors of the CIP system 350 may also include an encryption key generation processor 354. This processor 354 may be configured to generate encryption keys usable by the card microprocessor 322 to encrypt message content. In particular embodiments, the encryption key generation processor 354 may be configured to generate one or more UDK master keys that can each be combined with one of the one or more card identifiers to produce a card-unique UDK. The UDK master keys may be generated using any secure random or pseudorandom number generator. Each UDK master key may be associated with or included in the card record stored in the card database 359. In some embodiments, each UDK master key may be associated with unique identifiers for multiple transaction cards 320. In such embodiments, the UDK master keys may be stored separately and merely associated with individual card records. In some embodiments, the encryption key generation processor 354 may transmit for storage or otherwise permanently store the one or more UDK master keys in the memory 326 of the card 320. In such embodiments, the card microprocessor 322 may use each UDK master key to produce a card-unique UDK, which can then be used to generate a communication session key for encryption. In other embodiments, the encryption key generation processor 354 may, itself, uses a card-associated UDK master key in combination with a card identifier to generate a card-unique UDK, which is then transmitted for storage or otherwise permanently stored in the memory 326 of the card 320. In such embodiments, the card microprocessor 322 would not be required to regenerate the UDK for each communication. It need only retrieve the UDK from the memory 326.

The one or more automated data processors of the CIP system 350 may also include an shared secret generation processor 355. The shared secret generation processor 355 may be configured to generate a shared secret master key that can be combined with one of the one or more card identifiers to produce a shared secret value for the card 320. The shared secret master key may be generated using any secure random or pseudorandom number generator. The shared secret master key may be associated with or included in the card record stored in the card database 359. In some embodiments, the shared secret master key may be associated with unique identifiers for multiple transaction cards 320. In such embodiments, the shared secret master key may be stored separately and merely associated with individual card records. In some embodiments, the shared secret generation processor 355 may transmit for storage or otherwise permanently store the shared secret master key in the memory 326 of the card 320. In such embodiments, the card microprocessor 322 may use the shared secret master key in combination with one of the one or more card identifiers to produce a card unique shared secret value that can then be used to generate a message authentication code as previously described. In other embodiments, the shared secret generation processor 355 may, itself, use the shared secret master key in combination with a card identifier to generate the shared secret value, which is then transmitted for storage or otherwise permanently stored in the memory 326 of the card 320. In such embodiments, the card microprocessor 322 would not be required to regenerate the shared secret for each communication. It need only retrieve the shared secret from the memory 326. In all embodiments, the shared secret master key may be associated with or included in the card record for the card 320 stored in the card database 359.

The CIP system 350 may also include a key dissemination processor 356 configured for communicating with one or more card message processing systems 360 via the network communication interface 351 and the network 330. The key dissemination processor 356 may be configured to retrieve and transmit card information from the card record for each card 320 to some or all of the card message processing systems 360. Such card information may include one or more unique card identifiers, the one or more UDK master keys associated with the card 320 and the shared secret master key. In embodiments where the master keys are associated with multiple card identifiers, the master keys may not be included in the individual card records. In such embodiments, the master keys may be transmitted separately from the card records. In particular embodiments, the key dissemination processor 356 may be configured to transmit a single instance of each of the master keys along with the identifiers of all cards 320 associated with these master keys.

The key dissemination processor 356 may also be configured to identify or provide copies of the algorithms used to generate the UDKs and shared secret from their respective master keys. In some embodiments, transmission of card information may be made in response to a card information request from a card message processing system 360. The key dissemination processor 356 may be configured to receive, evaluate, and verify such a request and to transmit card information only upon verifying the authorization of the card message processing system 360 to receive such information for a particular card (or cards) 320.

Figure 8:
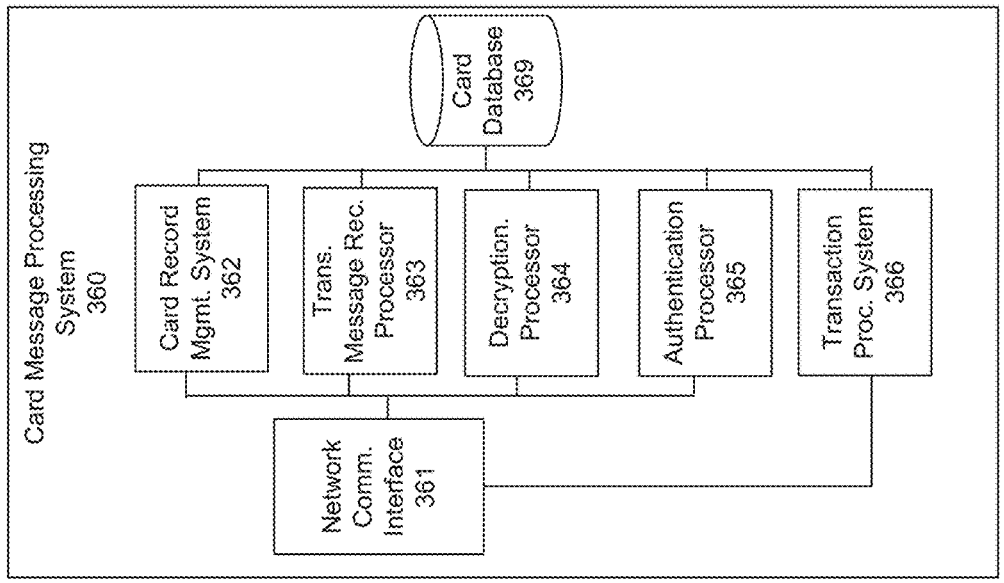
FIG. 8 is a schematic representation of a card message processing system according to an embodiment of the invention.

The card message processing (CMP) system 360 may be associated with a transaction processor, card transaction administrator, or other entity authorized to receive communications transmitted by a transaction card 320 via an intermediary device (e.g., a user device 310 or transaction processing machine 340). With reference to FIG. 8, the CMP system 360 may include a network communication interface 361 configured for selective communication over the network 330 and/or other networks. A card record management system 362 may be configured for receiving card information for one or more transaction cards 320 from the CIP system 350 and for storing such information in a card database 369. Each card record in the database 369 may include, without limitation, one or more unique card identifiers, one or more UDK master keys, and a shared secret master key. In some embodiments, each card record may also include an encrypted communication counter. In some embodiments, rather than the actual UDK and shared secret master keys, the card record may include master key index references to allow retrieval of the master keys associated with a particular card from a separate storage medium (e.g., in another encryption information database or within a secure module of the CMP system 360). In embodiments where the UDK and shared secret master keys are associated with card identifiers for multiple transaction cards 320, the card record may include only an indication of the association of such master keys with the one or more unique card identifiers. In particular embodiments, the stored master keys may include a first UDK master key for use in generating a UDK for decryption of message content and a second UDK master key for use in generating a UDK for decrypting a message authentication code cryptogram.

The CMP system 360 may also include one or more automated data processors configured to receive and decrypt messages received from a transaction card 320. These one or more communication interpretation processors may include a transaction message receiving data processor 363 configured to receive and evaluate each message. This may include interpreting non-encrypted information that may include, for example, identification information (e.g., a unique card identifier) sufficient to identify the specific card 320 from which the communication is received. In some embodiments, the non-encrypted information may include an encrypted communication counter value or information from which such a counter may be derived.

The one or more communication interpretation processors of the CMP system 360 may also include a decryption processor 364 configured to decrypt at least a portion of the decrypted information in the received message. This may include retrieving a first UDK master key for the card 320 from the card database 369 (or other storage location), and using the first UDK master key in combination with the appropriate card identifier to produce a first UDK. The first UDK may then be used to create a first session key for decrypting at least a portion of the encrypted content of the received message. The decrypted information may be or include sensitive transaction information that may be stored and/or transferred to the transaction processing system 366. In some embodiments, the decryption processor 364 may be configured to update an encrypted message counter associated with the transaction card 320. This counter may then be compared to a counter value received in the message and/or used as a shared parameter in any of the key or shared secret generation algorithms.

As previously described, the portion of the message including sensitive information encrypted with a particular session key may, in some embodiments, also include a message authentication code encrypted using the same session key. In such embodiments, the decryption processor 364 may transfer the decrypted method authentication code to the authentication processor 365 for use in authenticating the message. In other embodiments, however, the method authentication code may be separately encrypted, with the resulting cryptogram tacked onto the encrypted message. In such embodiments, the decryption processor 364 may be configured to retrieve a second UDK master key for the card 320 from the card database 369 (or other storage location), and use the second UDK master key in combination with the appropriate card identifier to produce a second UDK. The second UDK may then be used to create a second session key for decrypting the method authentication code cryptogram. The decrypted method authentication code may then be transferred to the authentication processor 365.

The authentication processor 365 may be configured to authenticate the received message based on comparison of decrypted parameters to non-encrypted information received in the message and/or information stored on the card record for the card 320. In particular embodiments, the authentication processor 365 may be configured to generate a method authentication code from known parameters for the card 320 and compare it to a decrypted method authentication code from the received message. In doing so, the authentication processor 365 may retrieve the shared secret master key from storage and use it with the appropriate card identifier and the appropriate diversification algorithm to generate the shared secret. In certain embodiments, shared secret generation may also require one or more additional shared parameters (e.g., an encrypted message counter). In such embodiments, the authentication processor 365 may also be configured to retrieve or otherwise determine the required one or more additional shared parameters for use in generating the shared secret.

The authentication processor 365 may be further configured to use the generated shared secret and the appropriate algorithm to generate a method authentication code and compare it to the decrypted method authentication code from the message. A match indicates authenticity of the message and its source. If the codes do not match, the authentication processor 365 may transmit an error message to the transaction processing system 366 and/or the intermediary device (e.g., user device 310 or transaction processing machine 340) through which the transaction card 320 transmitted the message. The authentication processor 365 may also terminate further processing of the message and any associated transaction. It may also decrement the encrypted message counter.

The authentication processor may be configured to pass the authentication result to the transaction processing system 366. In some embodiments, the transaction processing system 366 may be configured to process the information from the received message to initiate or complete a transaction. In other embodiments, the transaction processing system 366 may be configured to construct a transaction processing request and transmit it to a transaction processing authority or other financial entity for processing.

Figure 9:
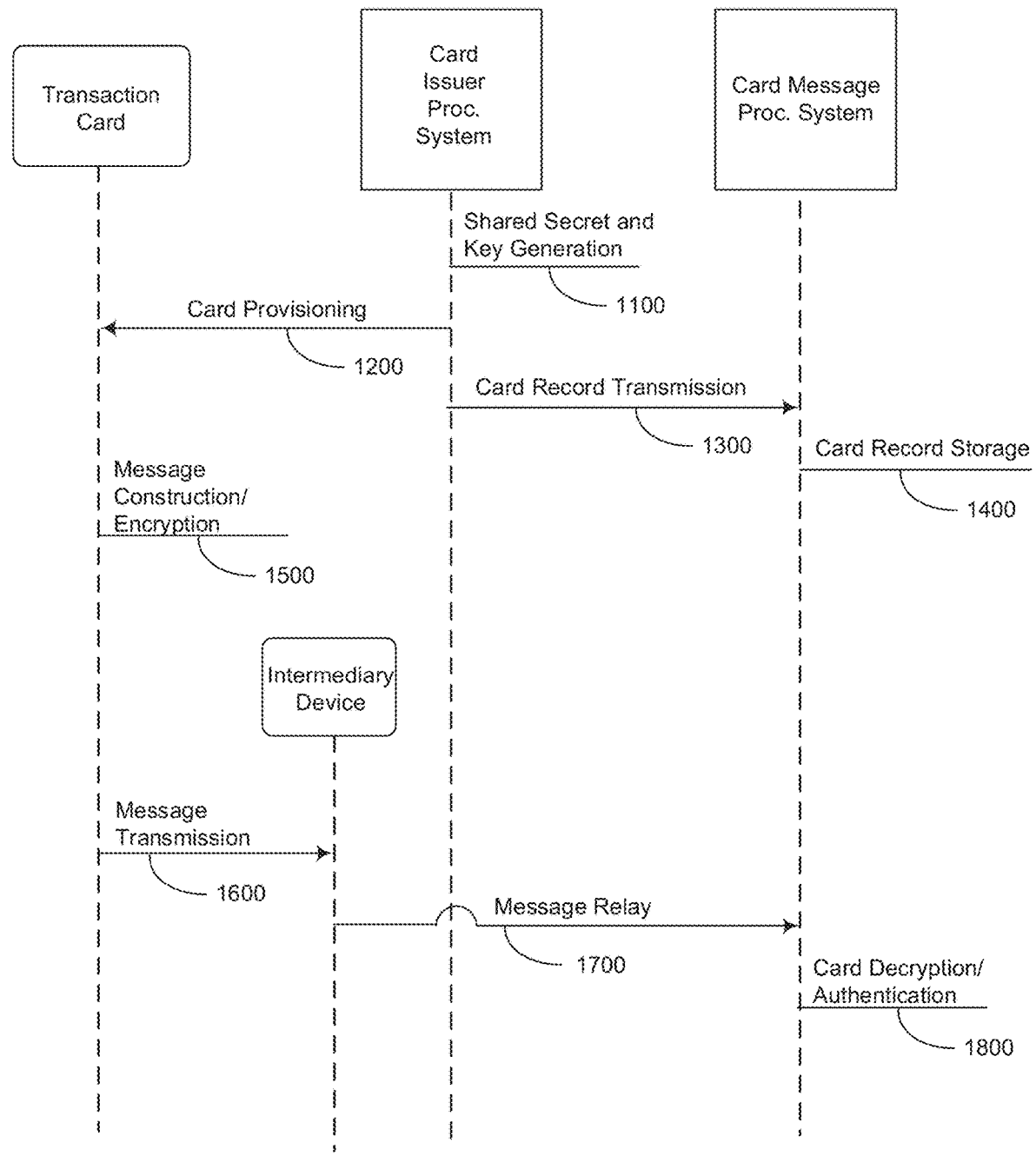
FIG. 9 is a sequence diagram illustrating a sequence of actions in facilitating an authenticatable encrypted communication according to an embodiment of the invention.

FIG. 9 schematically illustrates a sequence of operations in an illustrative use of the transaction card communication system 300. At 1100, the card issuer processing system generates the keys and/or shared secret for a particular transaction card as part of the provisioning process for that card. The generated keys include one or more UDK master keys and a shared secret master key. In embodiments where the shared secret is to be stored statically in the card memory, the card issuer may generate the shared secret from the shared secret master key and the card identifier. At 1200, the card issuer processing system provisions the card with the transaction card identifier and the one or more UDK master keys. It also provisions the card with either the shared secret master key or the shared secret itself.

At 1300, the card issuer processing system transmits card information to a card message processing system. This information may include a card identifier, the one or more UDK master keys and the shared secret master key. In embodiments where the master keys are each usable in conjunction with card identifiers for multiple cards, the card issuer may transmit a single instance of each of the master keys along with the identifiers of all cards associated with these master keys. At 1400, the card message processing system stores some or all of the card record in a card database for future use in interpreting a message from the transaction card.

At some time after provisioning, the card is issued to an account holder for use. At 1500, as part of a transaction encounter, the transaction card microprocessor constructs a message for transmission to the card message processing system. In doing so, the card microprocessor may retrieve the shared secret from the card memory or retrieve the shared secret master key and use it to generate the shared secret as previously described. The shared secret may then be used to generate a message authentication code. The card microprocessor may then retrieve a first UDK master key and use it to generate a first UDK, which in turn may in turn be used to generate a session key for encryption of at least a portion of the message. In some embodiments, the card microprocessor may also retrieve a second UDK master key for use generating a second UDK for encrypting the message authentication code.

At 1600, the transaction card transmits the message to an intermediary device with which the card is interacting to carry out the transaction for retransmission to the card message processing system. Depending on the circumstances, the intermediary device may be, for example, the account holder's mobile device or a merchant's transaction processing machine. The message may be transmitted via direct electrical contact or via NFC or other short range communication mode. At 1700, the intermediary device transmits the message to the card message processing system.

At 1800, the card message processing system receives and processes the message. This may include identifying the card based on unencrypted content of the message and, based on this identification, obtaining decryption information for the card from the card database. In particular, the card message processing system may retrieve the first UDK master key and (if appropriate) the second UDK master key and use them to generate the keys required to decrypt the encrypted content and the method authentication code. The card message processing system then decrypts the message and the message authentication code. The shared secret master key is then retrieved and used to generate the shared secret, which is then used to produce a message authentication code value for comparison to the code obtained from the message to authenticate the message and its source.

Figure 10:
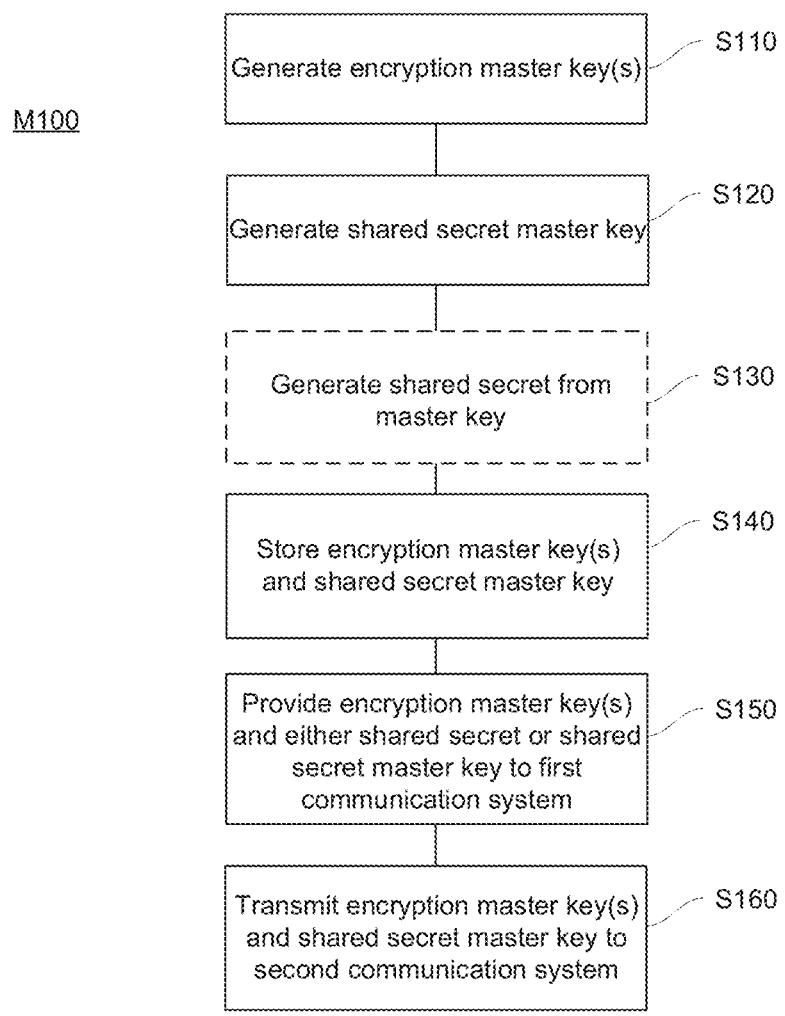
FIG. 10 is a flow chart of actions in a method of facilitating encrypted message authentication according to an embodiment of the invention.

With reference now to FIG. 10 a method M100 for facilitating encrypted message authentication will be described. The method M100 may be carried out by a network-enabled key generation and control system such as the system 240 depicted in FIG. 2 or the card issuer processing system 350 of FIG. 3. At S110 of the method M100, the key generation and control system may generate one or more encryption master keys for use in generating encryption and session keys for encryption of a message by a sending data processing system to be sent to a receiving data processing system. These master keys could be, for example, the UDK master keys used by the transaction card 320 of FIGS. 3 and 4. At S120, the key generation and control system may generate a shared secret master key for use in generating a shared secret value usable to produce a message authentication code. In some embodiments, the system may optionally generate the actual shared secret using the shared secret master key and a predetermined shared secret generation algorithm. In particular embodiments, the shared secret generation algorithm may require the use of an identifier or other unique information associated with the sending processing system. The key generation and control system may use an existing identifier or establish one for the sending processing system. In embodiments where the sending data processing system is the micro-chip of a transaction card, the identifier may be the card number or other card-unique identifier. At S140, the key generation and control system may associate the encryption master key (or keys) and the shared secret master key with the identifier for the sending system and store the keys and the identifier in an encryption key database.

At S150, the key generation and control system provides a first communication system (i.e., a sending data processing system) with the one or more encryption master keys and either a shared secret master key or the shared secret itself. Particular key generation and/or encryption algorithms may also be identified or provided. In embodiments where the first communication system is a transaction card, the master keys, algorithms, and/or the shared secret may be stored directly in the card memory or transmitted to the card microprocessor as part of the card provisioning process. In other embodiments, the master keys and algorithm identification (or algorithms) may be transmitted to the first communication data processing system over a network. In embodiments where the encryption information is transmitted over a network, the shared secret itself is preferably not transmitted.

At S150, the key generation and control system transmits via a network to a second communication system (i.e., a receiving data processing system) the one or more encryption master keys, key generation and encryption algorithms, and the shared secret master key.

Figure 11:
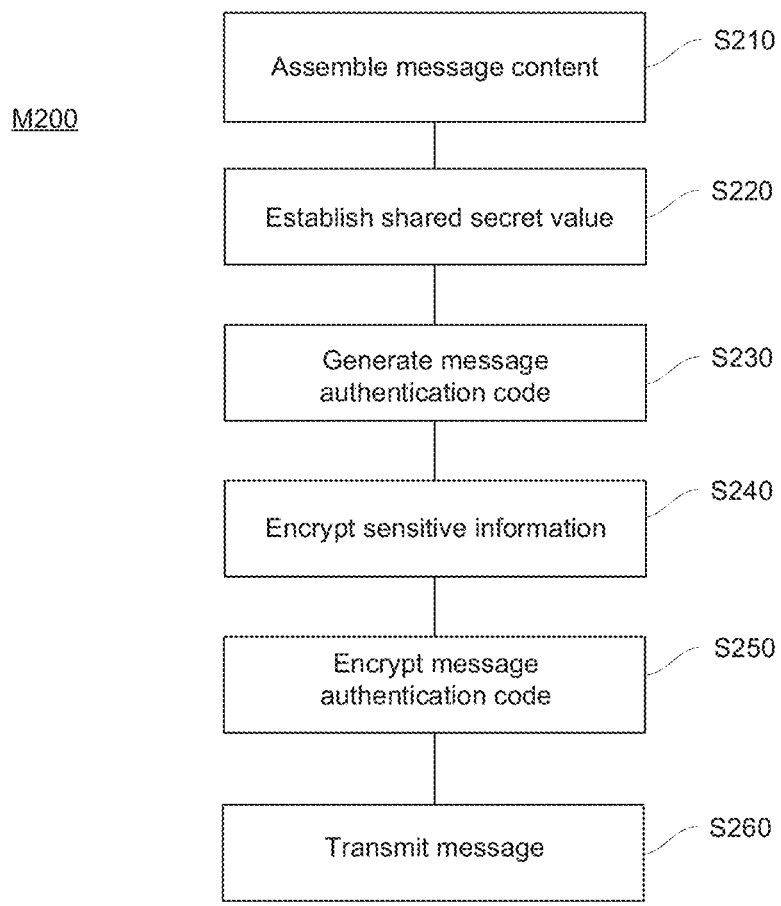
FIG. 11 is a flow chart of actions in a method of constructing an authenticatable encrypted message according to an embodiment of the invention.

With reference to FIG. 11, a method M200 for constructing an encrypted communication will be described. The method M200 may be carried out by a network-enabled processing system configured to act as the sending system of a symmetric communication pair. Such a sending system could be, for example, the sending system 110 of FIG. 1, the sending system 210 of FIG. 2, or the transaction card microprocessor 322 of FIG. 4. At S210 of the method M200, the sending system assembles the content of the message. This may include a first portion made up of non-sensitive information and a second portion made up of sensitive information. The non-sensitive information may be or include, for example, information usable by a receiving system to identify the sending system and/or other non-sensitive parameters (e.g., a message counter). In some embodiments, the action of assembling message content may be initiated in response to an authentication request received by the sending system. At S220, the sending system establishes a shared secret value that is usable to generate a message authentication code. In embodiments where the shared secret is statically stored in a memory accessible by a data processor of the sending system, the data processor may establish the shared secret value by retrieving it from the memory. In other embodiments, the data processor may retrieve a shared secret master key from the memory and use it in combination with a sending system unique identifier in a shared secret generation algorithm to generate the shared secret. In some embodiments, the shared secret algorithm may also require another shared parameter (e.g., an encrypted message counter) to generate the shared secret value. At S230, the shared secret value may be used by the sending system data processor as a salt in a MAC generation algorithm to generate a message authentication code.

At S250, the sending data processing system encrypts at least a portion of the message content. In particular embodiments, the sensitive information portion may be encrypted using a first session key. In some embodiments, the message authentication code may be encrypted along with the sensitive information portion using the first session key. In other embodiments, the message authentication code may be separately encrypted using a second session key to produce a method authentication cryptogram. As part of the encryption action, the sending system may retrieve a first encryption master key from a memory and combine it with a sending-system-unique identifier in an encryption key generation algorithm to generate a first sending-system-unique encryption key (e.g., the first UDK described above in relation to system 300 of FIG. 3). This, in turn, may be used to generate the first session key. Similarly, the sending system may retrieve a second encryption master key from the memory and combine it with the sending-system-unique identifier to generate a second sending-system-unique encryption key (e.g., the second UDK described above in relation to system 300 of FIG. 3), which may be used to generate the second session key. In some embodiments, the encryption key generation algorithm may also require another shared parameter (e.g., an encrypted message counter) to generate the shared secret value. In embodiments where an encrypted message counter is used, the counter may be incremented upon encryption of a message or upon transmission of an encrypted message.

At S260, the sending system assembles the non-encrypted and encrypted portions of the message and transmits it to a receiving communication system over a network. In some embodiments, the sending system may transmit the assembled message to the receiving communication system via an intermediary communication device, receives the message and retransmits via the network to the receiving communication data processing system.

Figure 12:
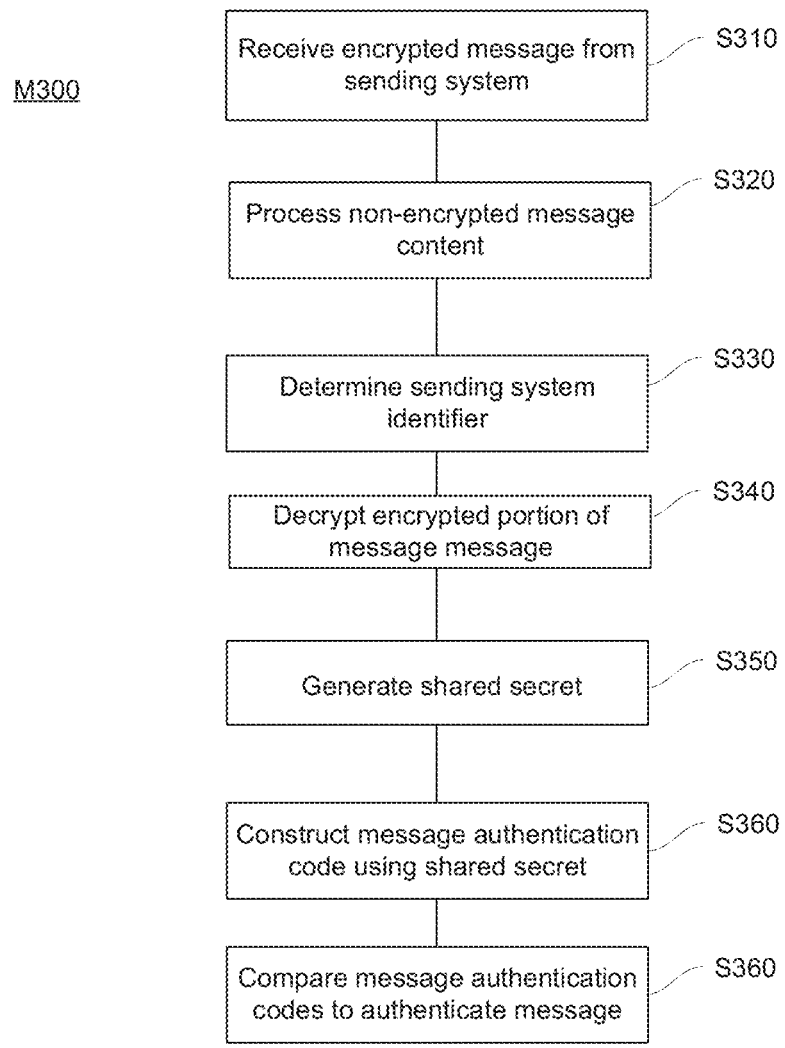
FIG. 12 is a flow chart of actions in a method of authenticating an encrypted message according to an embodiment of the invention.

With reference to FIG. 12, a method M300 for authenticating an encrypted communication will be described. The method M300 may be carried out by a network-enabled processing system configured to act as the receiving system of a symmetric communication pair. Such a receiving system could be, for example, the receiving system 120 of FIG. 1, the receiving system 220 of FIG. 2, or the card message processing system 360 of FIGS. 3 and 8. The receiving system has stored therein or has access to a database containing encryption information for one or more sending data processing systems. This encryption information may include one or more sending-system-specific identifiers, one or more encryption master keys, and a shared secret master key. In some embodiments, each master key may be associated with identifiers for more than one sending system, but are usable with the sending-system-specific identifiers to generate sending-system-specific encryption keys. In some embodiments (e.g., the system 200 of FIG. 2 and the system 300 of FIG. 3), the encryption information may be received from a third party data processing system that generates and disseminates the master keys.

At S310, the receiving data processing system receives a message comprising encrypted information from the sending system transmitted over a network. In certain embodiments, the message may be received from an intermediary device (e.g., the user device 310 or the transaction processing machine of FIG. 3), which received the message from the sending device and retransmitted to the receiving system over the network. At S320, the receiving system reviews the message and processes/reads the non-encrypted portion of the message. At S330 the receiving system determines an identifier for the sending data processing system. In some embodiments this may be included in or determinable from the non-encrypted information in the message.

At S340, the receiving data processing system decrypts the encrypted portion of the message. In some embodiments, the message includes a sensitive content portion and a message authentication code encrypted together using a first session key. As part of the action at S340, the receiving system may generate or retrieve the first session key and use it to decrypt both the message authentication code and the sensitive content. In embodiments where the first session key is generated, the receiving system may retrieve a first encryption master key from the encryption information database and combine it with the sending system identifier in the appropriate encryption key generation algorithm to generate the first sending-system-unique encryption key (e.g., the first UDK described above in relation to system 300 of FIG. 3). This, in turn, may be used to generate the first session key.

In some embodiments, the message authentication code is provided in a separately encrypted cryptogram constructed using a second session key. In these embodiments, the receiving system may retrieve a second encryption master key from the encryption information database and combine it with the sending system identifier to generate a second sending-system-unique encryption key (e.g., the second UDK described above in relation to system 300 of FIG. 3), which may be used to generate the second session key. This can then be used to decrypt the method authentication code.

In some embodiments, the encryption key generation algorithm may also require another shared parameter (e.g., an encrypted message counter) to generate the shared secret value. In embodiments where an encrypted message counter is used, the counter may be incremented upon receiving an encrypted message or upon decryption of a message.

At S350, the receiving data processing system retrieves the shared secret master key from the encryption information database and uses it with the sending system identifier to generate a shared secret value using the appropriate shared secret generation algorithm. In some embodiments, the shared secret generation algorithm may also require one or more additional shared parameters (e.g., an encrypted message counter) to generate the shared secret. At S360, the shared secret may be used in the appropriate MAC generation algorithm to generate a second message authentication code. At S370 the second message authentication code may be compared to the decrypted code from the message to authenticate the message. A match indicates authenticity of the message and its source. The receiving system may, responsive to a positive determination of authenticity, further process the information from the received message (e.g., to initiate or complete a transaction). If, however, the authentication codes do not match, the receiving system may transmit an error message to the sending system and/or the intermediary device (if any) through which the sending system transmitted the message. The receiving system may also terminate further processing of the message content and any associated transaction. It may also decrement the encrypted message counter (if used).

The present invention provides a method and system for authentication of symmetric encryption communications in which message authentication codes may be produced based on shared secret salt values that may be dynamically generated in parallel from a master key generated by a third party system. The result is more secure communication and construction of the shared data required for symmetric encryption communication.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A card comprising:
    a data processor;
    a communication interface configured for contact or contactless communication with an intermediary processing device; and
    a card memory having stored therein
        a shared secret master key and a unique card identifier, and
        a message encryption application comprising instructions for the data processor to
            generate a shared secret value using the unique card identifier and the shared secret master key,
            generate a message authentication code using the shared secret value,
            encrypt at least a portion of message content using a first session key to produce encrypted message content,
            encrypt the message authentication code,
            transmit, to the intermediary processing device for retransmission to a receiving communication processing system, a message comprising the encrypted message content and the encrypted message authentication code.

2. A card according to claim 1 wherein the message authentication code is encrypted using the first session key.

3. A card according to claim 1 wherein:
    the card memory also has stored therein at least one encryption master key, and
    the message encryption application further comprises instructions for the data processor to:
        generate a first card-unique encryption key using the unique card identifier and a first one of the at least one encryption master key, and
        generate the first session key using the first card-unique encryption key.

4. A card according to claim 3 wherein:
the message encryption application further comprises instructions for the data processor to:
generate a second card-unique encryption key using the unique card identifier and a second one of the at least one encryption master key, and
generate a second session key using the second card-unique encryption key, and
the message authentication code is encrypted using the second session key.

5. A card according to claim 1 wherein:
the card memory also has stored therein an encryption counter,
the message encryption application uses the encryption counter along with the unique card identifier and the shared secret master key to generate the shared secret value, and
the message encryption application further comprises instructions for the data processor to increment the encryption counter after generating the message authentication code.

6. A card according to claim 5 wherein the encryption counter is included in the message.

7. A method of facilitating symmetric encryption communications between a transmitting data processing system having a unique identifier associated therewith and a receiving data processing system, the method comprising:
generating, by a key generation data processing system, at least one encryption master key, each encryption master key being configured for use with the unique identifier and a first encryption algorithm to produce a transmitting system-unique encryption key;
generating, by the key generation data processing system, a shared secret master key configured for use with the unique identifier and a second encryption algorithm to produce a shared secret value;
storing, by the key generation data processing system, the at least one encryption master key and the shared secret master key in association with the unique identifier in an encryption information database;
transmitting, by the key generation data processing system, the at least one encryption master key and shared secret information to the transmitting data processing system; and
transmitting, by the key generation data processing system, the at least one encryption master key, the shared secret master key, and the unique identifier to the receiving data processing system.

8. A method according to claim 7 further comprising;
generating, by the key generation data processing system, a shared secret value using the shared secret master key and the second encryption algorithm,
wherein the shared secret information is or includes the shared secret value.

9. A method according to claim 7 wherein the shared secret information is or includes the shared secret master key.

10. A method according to claim 7 wherein the transmitting data processing system is or includes a microprocessor mounted to a transaction card and the actions of generating at least one encryption master key, generating a shared secret master key, storing the at least one encryption master key and the shared secret master key, and transmitting the at least one encryption master key and shared secret information are carried out as part of a provisioning process for the transaction card.

11. A method according to claim 10 wherein the receiving data processing system is a card message processing system configured for decrypting and authenticating messages transmitted by the transaction card using the at least one encryption master key and the shared secret master key.

12. A method according to claim 7 wherein each encryption master key is configured for use with an encryption counter along with the unique identifier and the first encryption algorithm to produce the transmitting system-unique encryption key.

13. A method according to claim 7 wherein shared secret master key is configured for use with an encryption counter along with the unique identifier and the second encryption algorithm to produce the shared secret value.

14. A method of authenticating a message transmitted by a sending data processing system having a unique identifier associated therewith where the transmitted message comprises encrypted content and an encrypted message authentication code, the method comprising:
receiving, by a receiving data processing system, the transmitted message;
determining, by the receiving data processing system, the unique identifier;
retrieving, by the receiving data processing system from a database, an encryption information record for the sending data processing system, the encryption information record comprising a shared secret master key;
decrypting, by the receiving data processing system, the encrypted message authentication code;
generating, by the receiving data processing system, a shared secret value using the unique identifier and the shared secret master key;
generating, by the receiving data processing system, a comparison message authentication code using the shared secret value; and
comparing, by the receiving data processing system, the comparison message authentication code to the decrypted message authentication code to determine a message authentication result.

15. A method according to claim 14 wherein the encryption information record comprises at least one encryption master key and the method further comprises:
generating, by the receiving data processing system, a first sending system-unique encryption key using the unique identifier and a first one of the at least one encryption master key;
generating a first session key using the first sending system-unique encryption key; and
decrypting at least a portion of the encrypted content using the first session key.

16. A method according to claim 15 wherein the action of decrypting the encrypted message authentication code is carried out using the first session key.

17. A method according to claim 15 further comprising:
generating, by the receiving data processing system, a second sending system-unique encryption key using the unique identifier and a second one of the at least one master key; and
generating a second session key using the second sending system-unique encryption key,
wherein the action of decrypting the encrypted message authentication code is carried out using the second session key.

18. A method according to claim 14 wherein:
the encryption information record further comprises an encryption counter.

19. A method according to claim 18 further comprising:

incrementing, by the receiving data processing system, the encryption counter in the encryption information record; and storing the encryption information record with the incremented encryption counter in the database.

20. A method according to claim 14 wherein:

an unencrypted portion of the transmitted message comprises an encryption counter, and the action of generating a shared secret value is carried out using the encryption counter in addition to the unique identifier and the shared secret master key.

\* \* \* \* \*

UNITED STATES PATENT AND TRADEMARK OFFICE
CERTIFICATE OF CORRECTION

| | | |
|---|---|---|
| PATENT NO. | : 12,289,396 B2 | Page 1 of 1 |
| APPLICATION NO. | : 17/890628 | |
| DATED | : April 29, 2025 | |
| INVENTOR(S) | : Kevin Osborn et al. | |

It is certified that error appears in the above-identified patent and that said Letters Patent is hereby corrected as shown below:

On the Title Page

Item (72):
Please change "Kevin Osborn, Henrico, VA (US)" to -- Kevin Osborn, Newton Highlands, MA (US) --.

Signed and Sealed this
Fifteenth Day of July, 2025

Coke Morgan Stewart
*Acting Director of the United States Patent and Trademark Office*